June 25, 1963

P. H. ROWE, JR 3,095,485

PROGRAMMER

Filed July 5, 1961

INVENTOR.
PAUL H. ROWE, JR.
BY
Flam and Flam
ATTORNEYS.

June 25, 1963  P. H. ROWE, JR  3,095,485
PROGRAMMER
Filed July 5, 1961  4 Sheets-Sheet 2
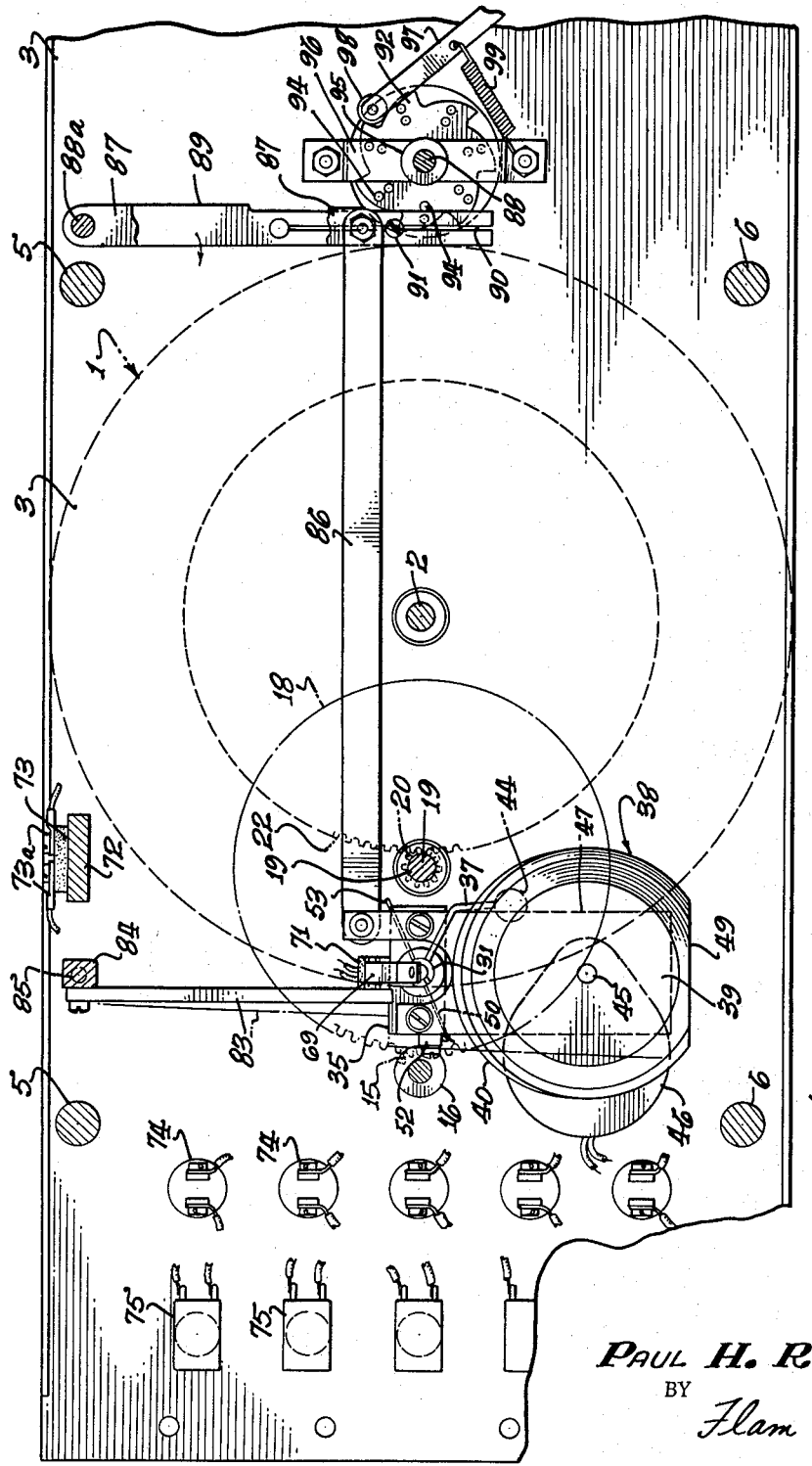
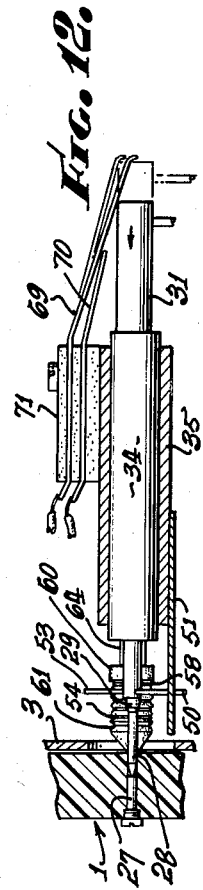
INVENTOR.
PAUL H. ROWE, JR.
BY
Flam and Flam
ATTORNEYS.

June 25, 1963
P. H. ROWE, JR
3,095,485
PROGRAMMER
Filed July 5, 1961
4 Sheets-Sheet 3
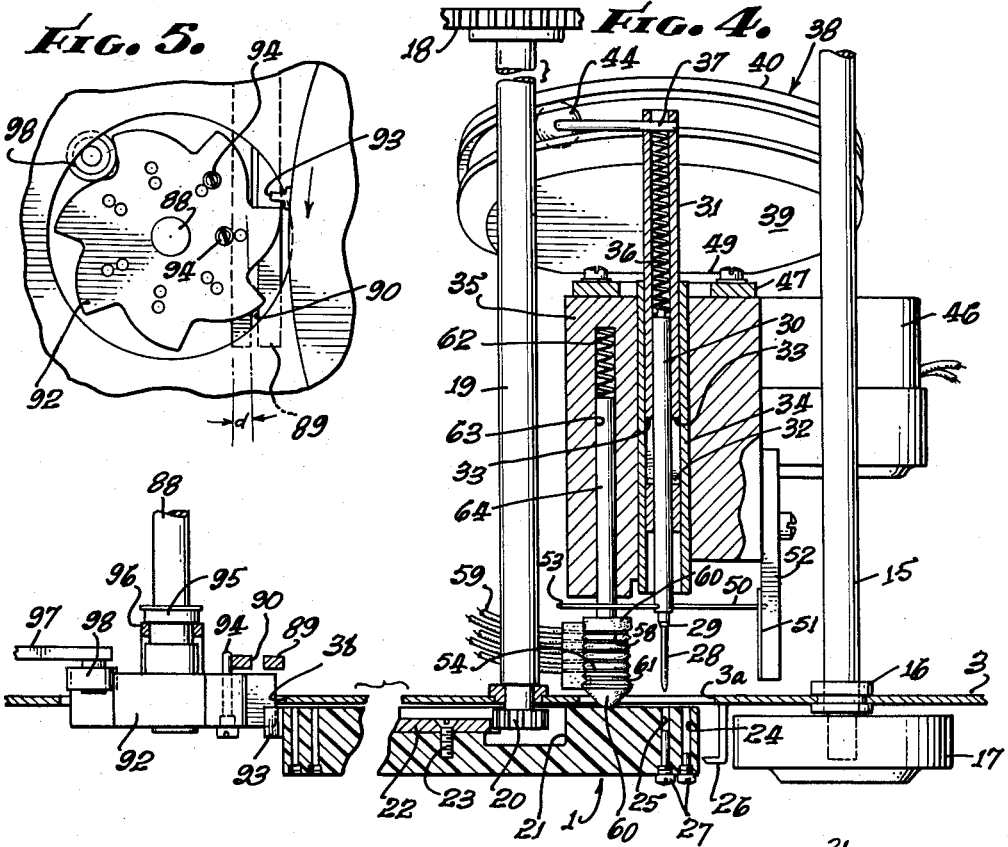
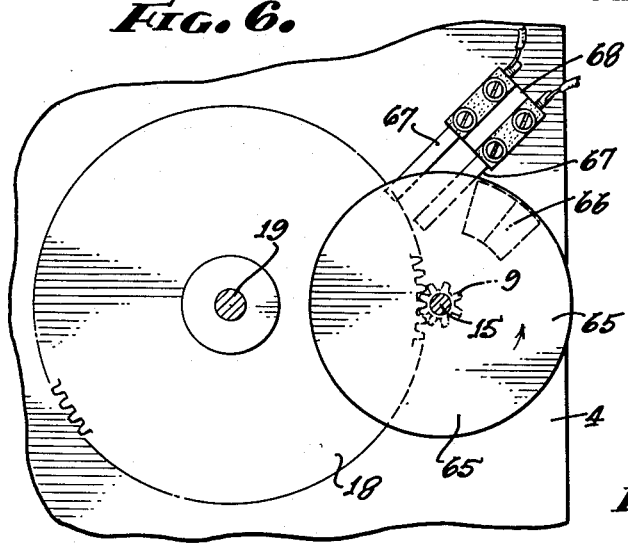
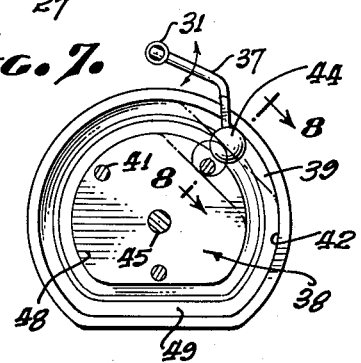
INVENTOR.
PAUL H. ROWE, JR.
BY
Flam and Flam
ATTORNEYS.

June 25, 1963 P. H. ROWE, JR 3,095,485
PROGRAMMER
Filed July 5, 1961 4 Sheets-Sheet 4
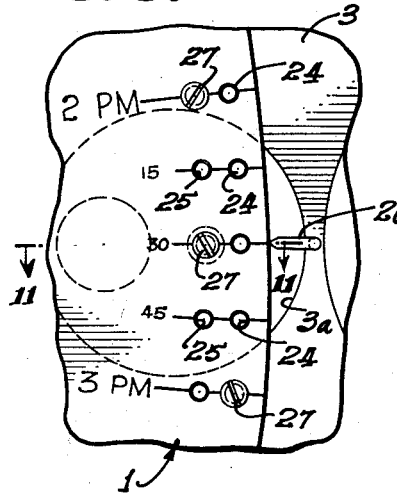
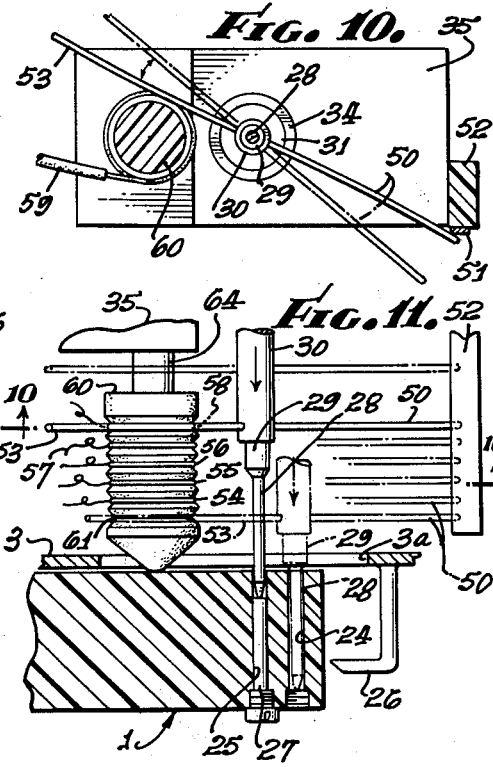
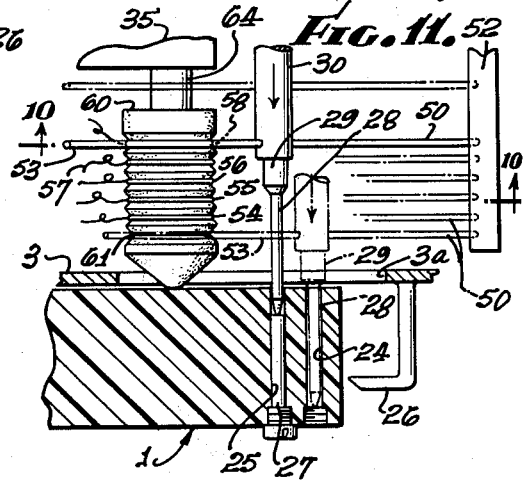
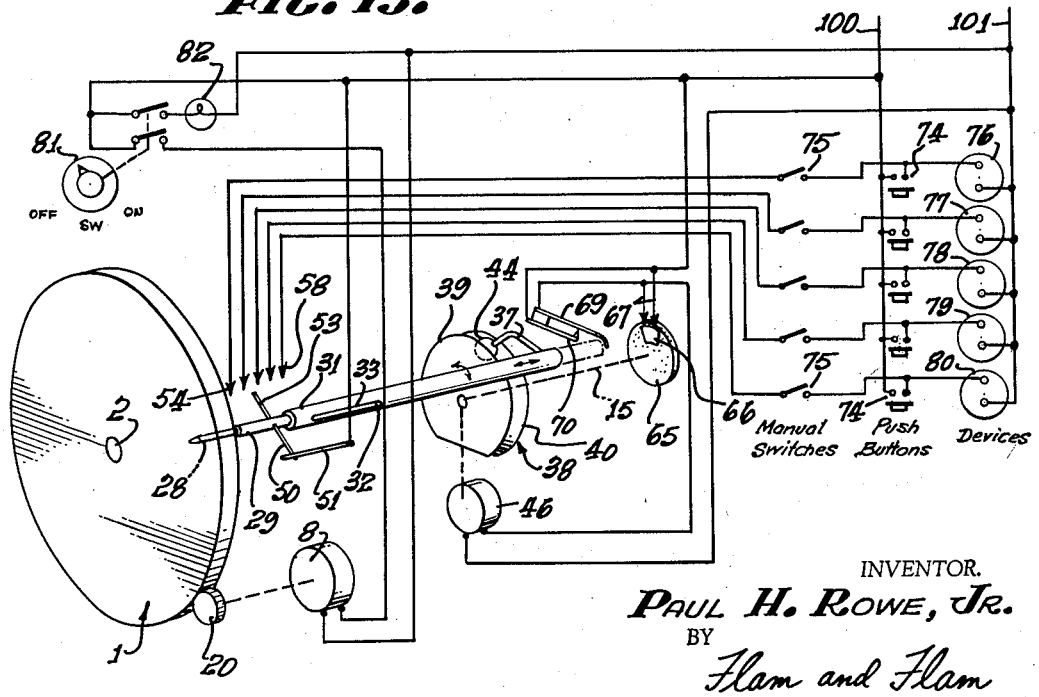
INVENTOR.
PAUL H. ROWE, JR.
BY
*Flam and Flam*
ATTORNEYS.

United States Patent Office 3,095,485
Patented June 25, 1963

3,095,485
PROGRAMMER
Paul H. Rowe, Jr., Los Angeles, Calif., assignor, by mesne assignments, to Maas-Rowe Carillons, Los Angeles, Calif., a co-partnership
Filed July 5, 1961, Ser. No. 121,960
10 Claims. (Cl. 200—35)

This invention relates to a control system utilizing electrical elements. Such a system may be useful for initiating a plurality of electrical or mechanical functions.

More particularly, the system is adapted to initiate functions in a predetermined sequence, the functions being optionally timed, for programming purposes.

One programming device that may readily utilize embodiments of the invention is a synchronous clock motor drive for periodically and sequentially causing chimes to be sounded.

It is one of the objects of this invention to simplify the circuit controls, and particularly by making it possible, in a simple manner, selectively to energize a number of optional circuits, whenever the programming device arrives at a significant position.

It is another object of this invention to provide a circuit controller that selects one of a number of circuits by predetermining the depth attained by a probe carrying one of the contacts. For example, in a clock programming device, a program wheel may be provided, having recesses which may in succession be brought into registry with the probe, which moves into the registering recess until stopped by the bottom of the recess. The depth of the recess thus predetermines the circuit to be energized.

It is accordingly another object of this invention to provide a probe control of this character for a programming device.

It is another object of this invention to make it possible to select at will, any one of several prearranged programs by aid of a simple mechanism. For example, in clock programming, the recesses for one program may be arranged in a circle on a memory disc; another set of recesses may be provided in a circle radially spaced from the first set. By adjusting the radial distance of the probe, either set of annular recesses may be selected to cooperate with the probe.

This invention possesses many other advantages and has other objects which may be made more clearly apparent from a consideration of one embodiment of the invention. For this purpose, there is shown a form of the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIG. 3 is a sectional view, taken along a plane corresponding to line 3—3 of FIG. 2;

FIG. 4 is an enlarged sectional view, partly broken away, taken along a plane corresponding to line 4—4 of FIG. 1;

FIG. 5 is a fragmentary detail elevation illustrating the manner in which the programming may be changed at the conclusion of a complete programming cycle;

FIG. 6 is a sectional view, taken along a plane corresponding to line 6—6 of FIG. 2;

FIG. 7 is a view of a cam mechanism for operating the probe contact, taken along a plane corresponding to line 7—7 of FIG. 2.

FIG. 8 is a detail fragmentary sectional view, taken along a plane corresponding to line 8—8 of FIG. 7;

FIG. 9 is an enlarged fragmentary view of the right-hand portion of the program wheel;

FIG. 10 is a sectional view, taken along a plane corresponding to line 10—10 of FIG. 11;

FIG. 11 is a sectional view, taken along a plane corresponding to line 11—11 of FIG. 9;

FIG. 12 is an enlarged view, partially in section, of the probe and its associated circuit controller; and FIG. 13 is a wiring diagram illustrating the manner in which the device may be used for controlling the electrical circuits.

Figure 1:
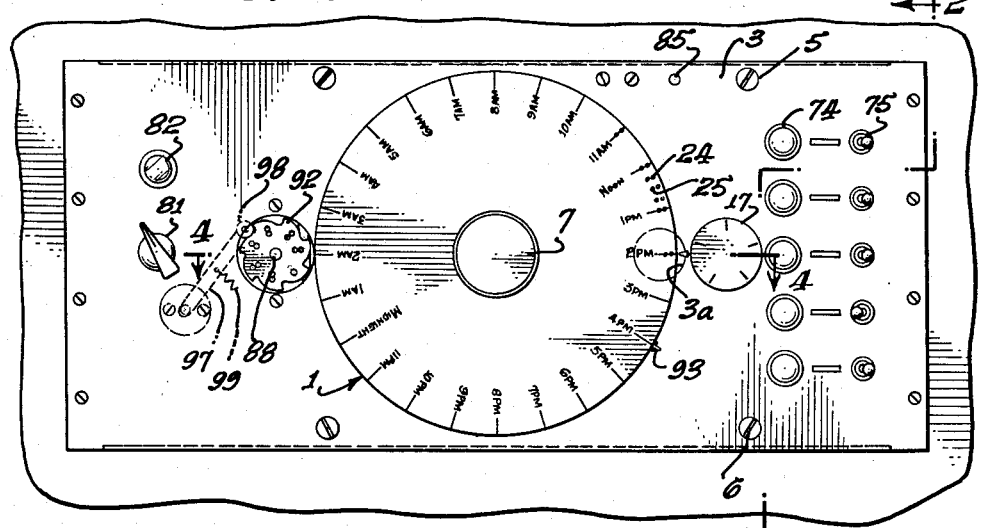
FIGURE 1 is a front elevation of an apparatus incorporating the invention.
Figure 2:
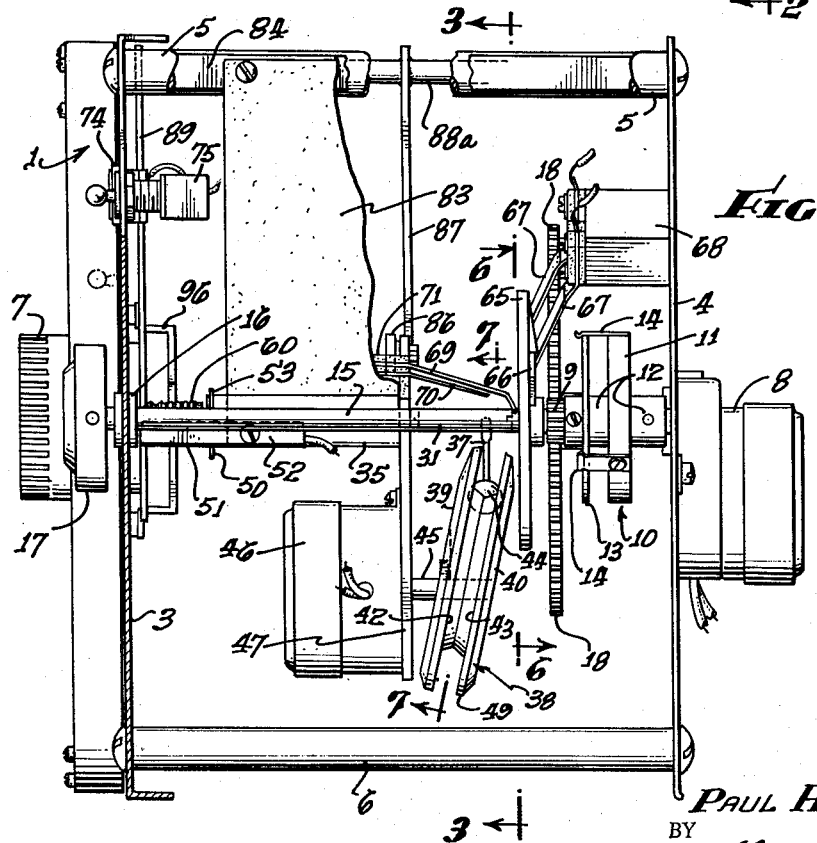
FIG. 2 is an enlarged sectional view, taken along a plane corresponding to line 2—2 of FIG. 1.

A programming wheel 1 is shown as moved by clockwork mechanism. For this purpose, the wheel 1 is rotatably mounted upon a shaft 2 (FIG. 3) suitably journalled in the front panel 3 and rear panel 4 of the apparatus (FIGS. 1 and 2). These front and rear panels may be held in spaced relation by the spacers 5, 6 shown most clearly in FIG. 2.

The wheel 1 in this instance is a twenty-four hour wheel corresponding to a full day's programming. It is shown appropriately marked with the hour designations in FIG. 1. The wheel 1 is held against removal from its shaft 2 as by the aid of a knurled knob 7. This shaft projects through front panel 3 via a clearance aperture. This knob 7 may be threadedly engaged with a reduced portion of the shaft 2.

The wheel 1 may be intermittently or continuously rotated. In this way, the controlling parts of the wheel may be brought successively into cooperative relationship with a circuit controller as hereinafter described.

In the present instance, the wheel 1 is rotated by a synchronous motor 8 (FIG. 2) mounted upon the rear panel 4 and operating a pinion 9. This pinion 9 is driven by the motor 8 through a clutch mechanism 10. One part of the mechanism 10 is a disc 11 having a hub 12 carried by the output shaft of the motor 8. The pinion 9 is mounted on a coaxial shaft 15 (FIGS. 2, 3 and 6) and coupled to the cooperating clutch part 13. The two clutch parts are held in engagement in the position shown in FIG. 2 by the aid of a plurality of spring fingers 14. The shaft 15 passes through an appropriate bearing structure 16 mounted on the front panel 3. This shaft carries a knob 17 for moving the shaft 15 axially to move the associated clutch member 13 out of engagement with the spring fingers 14, making it possible to rotate the pinion 9 manually by aid of knob 17, and independently of the motor 8.

Pinion 9 engages a relatively large spur gear 18 (FIG. 2). This spur gear 18 is mounted on a shaft 19 (FIG. 4) extending through bearings mounted on front panel 3. A pinion 20 (see also FIG. 3) is mounted on the forward end of the shaft. This pinion extends into a groove 21 (FIG. 4) located in the back of the wheel 1, and engages a large spur gear 22 fastened to the rear surface of the wheel 1, as by the aid of the screws 23. The rim portion of the wheel 1 is made quite thick and quite closely approaches the front surface on the front panel 3. An opening 3a (FIG. 4) in front panel 3 exposes a rear surface of the wheel 1 to the interior of the mechanism.

When it is desired to "set" the clock for any reason, the knob 17 may be pulled toward the left, as viewed in FIG. 2, thereby moving the shaft 15 which carries the pinion 9 toward the left while maintaining it in engagement with the gear 18. This makes it possible to rotate the program wheel by aid of pinion 9, to any desired position.

In the present instance, the wheel 1 carries two series of apertures 24 and 25, both arranged in an annular circle radially spaced from each other (FIGS. 9 and 11). Either series of annularly arranged apertures 24, 25 may be optionally chosen to provide two alternative programs, as hereinafter explained.

As shown most clearly in FIGS. 9 and 11, one aperture of the series of apertures 24 as well as one aperture of the series of apertures 25 are in alignment with a pointer 26 mounted on the front panel 3. These apertures are exposed by the opening 3a. The inner row 25 is active for the setting of the apparatus illustrated.

Thus, each aperture of the series of apertures 24, 25 may accommodate a headed plug structure 27 having a threaded portion adapted to be threaded into the front end of the associated aperture. The plug structure 27 has an unthreaded portion forming a stop or limit for the entry of a probe 28. In the position shown in FIG. 11, the plug structure 27 is quite long so that a probe 28 enters only to a short distance into the aperture 25. The aperture 24 aligning with aperture 25 in FIG. 11 is shown as unplugged which means that the probe shown in phantom lines in FIG. 11 can extend all the way in until stopped by a collar 29 carried by the probe. This condition corresponds to a blank to ensure that no circuit is closed in the absence of a plug. FIG. 9 illustrates some of the apertures 24, 25 as plugged and others as open according to the selection of the person constructing the program.

The position of the probe when in contact with the inner end of the plug structure 27 selects the circuit to be closed. Thus, the probe 28 and the collar 29 are both mounted on an axially movable probe support 30 (FIG. 4). The probe support 30 is slidably mounted in a tube or guide sleeve 31. Relative movement between the probe support 30 and the sleeve 31 is effected by the aid of a pin 32 mounted on the support 30 and operating in slots 33 formed in the wall of tube 31. The tube 31 in turn is guided in a guide sleeve 34 mounted in a supporting block 35 (see also FIGS. 10 and 12). The probe support 30 is pressed resiliently toward the wheel 1 by the aid of a compression spring 36. The upper end of this spring is confined against expansion by a transverse rod 37.

By moving the sleeve 31 axially, the probe 28 is caused resiliently to engage the bottom of a registering recess formed by one of the apertures 25. The arrangement is such that the axial movement of sleeve 31 is cyclically always the same and corresponds to the maximum excursion of the probe, as viewed in phantom lines in FIG. 11. However, should the movement of the probe be stopped by a plug 27, the compression spring 36 permits continued movement of the tube 31.

Movement of the tube 31 in an axial direction is effected by the aid of a cam structure 38 (FIGS. 2, 3, 4, 7 and 8). This cam structure 38 is formed of two halves 39 and 40 held together, as by a series of screws 41. Each half 39 and 40 is provided with an annular groove 42 or 43, which together serve to confine a cam follower 44. This cam follower 44 is in the form of a sphere and is carried by the end of the rod 37 (see also FIG. 4). By joining the two halves 39 and 40 together, the ball 44 is confined against movement except along the periphery of the cam.

The cam is tilted with respect to the axis of the probe structure and is mounted in this position upon a rotatable shaft 45. Such a tilt produces the axial motion. Shaft 45 forms the output shaft of a small motor 46 mounted upon a plate or bracket 47. This plate or bracket 47 in turn is mounted on one end of the support 35 (FIGS. 2 and 3). The upper end of the bracket 47 has a cutaway portion to permit the passage of the probe tube 31.

As shown in FIG. 7, the ball or sphere 44 is confined to a path corresponding generally to the periphery 48 of the inner or contacting surfaces of the halves 39, 40 (FIG. 8). This periphery is defined by the inner sloping surfaces of the recesses 42 and 43 which contact the ball 44 tangentially.

As shown in FIG. 7, one portion of the cam (the lowermost portion as in the position of FIG. 7) has a flat part 49. This flat part comes at that portion of the periphery corresponding to the innermost position of probe 28, or at the bottom as viewed in FIG. 7. When this flat part comes into operating position after more than a half-revolution, as shown in phantom lines in FIG. 7, the ball 44 is moved radially inwardly of the cam structure to correspond to the flat portion 44. This causes the sleeve 31 to be moved in a clockwise direction. This movement in turn, as viewed in FIG. 10, causes the probe 28 to move in a counter-clockwise direction since there is a pin-and-slot coupling between the probe support 30 and the sleeve 31.

The rotation of the cam structure 38 through one revolution thus reciprocates the sleeve 31 through a definite axial movement corresponding to the slope of the cam structure 38. When the inward movement of the tube 31 is completed, the flat portion 49 comes into play to move the tube 31 angularly.

This angular movement, as hereinabove stated, causes contacts to be made. The probe structure 28 carries a resilient contact member 50 (FIGS. 10 and 12). This contact member upon rotation of tube 31, then makes contact with a conducting or bus bar 51 carried on an insulation support 52. This insulation support, as shown most clearly in FIG. 10, is mounted on one side of the support 35.

At the same time, another resilient contact member 53 (FIG. 10) engages one of a series of contact rings 54, 55, 56, 57 and 58, shown to best advantage in FIG. 11. These rings are connected individually to corresponding leads 59, as shown in FIG. 4. The support 60 for these rings is made of insulation material. This insulation support can be in the form of grooved cylinder made in any appropriate manner. A groove 61 is provided near the tip end of the support 60 so that when the probe 28 is extended completely into an aperture 24 or 25, the contact member 53 simply contacts the bottom of the groove 61 without making contact with any of the contact rings.

Otherwise, only one of the rings 54 to 58 may be contacted. The specific ring contacted depends upon the depth of penetration of the probe 28 within its registering aperture 24 or 25.

The contact support 60 has a conical point contacting the inner surface of the wheel 1. It is urged resiliently into contact by the aid of a compression spring 62 (FIG. 4). This compression spring 62 is located in an aperture 63 in support 35 and urges the stem 64 toward the wheel 1. The conical discs forming the support 60 can be appropriately fastened to the stem 64. The pointed end of the support 60 thus ensures that the contact rings 54 to 58 will be positioned accurately so that the movement of the probe 28 inwardly of the registering apertures will cause accurate registry of the contact member 53 with the desired contact ring 54 to 58.

The complete cycle therefore includes inward movement of the probe 28; then rotation in a counter-clockwise direction of the contact members 50 and 53, as shown in FIG. 10, into the phantom line position; then a clockwise movement to bring the contact members into the full-line position of FIG. 10; and finally a withdrawal of the probe 28. This is effected in proper sequence due to the formation of the cam structure 38.

Since wheel 1 is slowly advanced to make one revolution in twenty-four hours, the slight angular movement of the apertures 24 and 25 during the probing operation is not sufficient to cause loss of registry between the probe 28 and these apertures. These apertures are purposely made large enough to accommodate the slight movement. Furthermore, the speed of rotation of cam 38 is fast enough so that the entire reciprocation cycle for the probe 28 occurs in about four seconds.

The actuations of the probe 28 through a complete cycle as just described are periodically effected by periodically energizing the motor 46 (FIG. 2) through one revolution of the cam structure 38. For this purpose, an insulation disc 65 is mounted on the shaft 15. Accordingly, the insulation disc 65, as shown most clearly in FIG. 6, is rotated by the clock mechanism at the rate of once during a definite period, such as five minutes or fifteen minutes. In the present instance, the shaft 15 rotates once every five minutes so as to effect a corresponding cycle of probing.

For this purpose, the insulation disc 65 carries a contact segment 66 which cooperates once each revolution with a pair of contact fingers 67 (FIG. 2) appropriately mounted on a block 68 supported on the rear panel 4 (FIGS. 2 and 6). Appropriate insulation layers are provided for these contacts. Although they are only momentarily made, there are holding contacts effective throughout the remainder of the revolution to cause the motor 46 to be energized during a complete revolution of the cam 38.

These holding contacts are shown to best advantage in FIG. 12. They comprise two contact fingers 69 and 70 appropriately mounted on an insulated structure 71 in turn supported on the cam support 35. In a retracted position of the probe 28, as indicated by phantom lines in FIG. 12, the contact fingers are out of engagement. However, as soon as the tube 31 is moved toward the left by cam structure 38, contact is made between the contact fingers 69 and 70, thereby ensuring continued energization of the motor 46. This is also indicated in the wiring program of FIG. 13, the contact fingers 69 and 70 being in parallel circuit with contact fingers 67, and in series with motor 46 across supply mains 100, 101. However, as the cam structure 38 completes its cycle and the tube 31 is moved to the extreme righthand or phantom position of FIG. 12, the circuit is interrupted and the probing cycle is ended.

As shown most clearly in FIG. 3, a supporting bar 72 extends across the mechanism between the panels 3 and 4 and adjacent the top thereof, so as to provide a support for terminal blocks 73. These terminal blocks provide supports for terminals 73a to make appropriate connections to push-button devices 74 and manually operated switches 75. These may be mounted so as to be available for operation from the front of the panel 3, as shown in FIG. 1. The switches 74 and 75 are also indicated in the wiring diagram of FIG. 13. The manually operated switches 75 make it optional with the operator which of the circuits controlled by the contact mechanism are to be controlled. Loads 76 to 80, inclusive, are intended to be energized through these manually operated switches. Furthermore, the push-buttons 74 make it possible to operate each of the devices 76 to 80 independently of the programming mechanism. Thus as shown in FIG. 13, each load is independently connected across the mains 100, 101 via push buttons 74. The switches 75 are in series with the probe contacts, and each series circuit is connected across the mains 100, 101.

A main on-and-off switch 81 is also indicated for interrupting the power supplied to both of the motors 8 and 46 as well as to the loads 76 to 80. A pilot light 82 (FIG. 1) in series with the on-off switch may serve to indicate whether the programming device is operative or not.

The block 35 and bracket 47, as shown most clearly in FIGS. 2, 3, 4 and 10, serve together to support the motor 46 with its cam 38, the probe structure 30, the contact ring structure support 60, and its associate rings 54 to 58, inclusive. The support 35 and the bracket 47 are arranged to be moved in a direction parallel to the face of the wheel 1 so as to move the probe structure and the contact mechanism associated therewith to cooperate with the inner or outer annular series of apertures 24 or 25.

In full-line position of FIG. 11, for example, the inner annular circle is active and the outer annular circle comprising the series of apertures 24 is active when the probe structure 28 is in the phantom-line position. This movement, urging the support 35 and its associated parts toward the left as viewed in FIGS. 2 and 3, is accomplished by attaching the support 35 on a wide flat support 83. This support member 83 in turn is attached to an angularly movable rectangular rod 84 pivoted by the aid of the pivot screws about an axis 85 (FIG. 3).

The pivotal movement is effected by a link 86 pivoted to an extension of one edge of the bracket 47. Link 86 is pivoted to another link 87 (FIG. 2) firmly affixed to a cross bar 88a pivotally mounted on the front and rear panels 3 and 4. Adjacent the front panel 3 is an arm 89 also carried by the pivoted rod 88. The lower end of this arm 89 is cleft, as indicated by reference character 90. The over-all width of the arm 89 may therefore be adjusted. For example, the screw or pin 91 of tapered configuration may be engaged in the cleft. Such adjustment may be necessary exactly to determine the extent of adjustment of the probe structure.

A cam wheel 92 mounted on a shaft 88 is arranged to be adjusted at the end of each day by one-seventh of a revolution. This wheel projects through aperture 3b of front panel 3 (FIGS. 4 and 5). It carries one or more pins 94 which engage the edge of the arm 89. As shown most clearly in FIG. 3, the pins 94 can be positioned selectively at an outer aperture or an adjacent inner aperture to move the arm 89 to a different degree corresponding to registry of the probe 28 with the outer or inner set of apertures 24 or 25. The extent of leftward travel is thus dependent on contact of pin 94 with an adjustable edge of the arm 86. As shown in FIG. 5, this leftward adjustment is indicated by the dimension $d$. Additionally, there may be no pin 94 at a particular station whereby the probe 28 is moved inwardly of the inner set of apertures 25 to be stopped at all times by the back surface of program wheel 1. Thus the apparatus can be turned off for a selected number of days.

The shaft 88 for cam wheel 92 is appropriately mounted for angular movement in bearings 95 supported on the front panel 3, as by the aid of a strap 96. Its other end is also pivotally supported at rear panel 4. Furthermore, the periphery of the cam wheel 92 has seven ratchet teeth advanced one tooth at a time by the projection 93 carried on the periphery of the wheel 1 (FIGS. 1, 4 and 5). Thus for each revolution of wheel 1, the cam wheel is advanced by a seventh of a revolution. This brings one of the pins 84 in the path of arm 89.

Gravity may be, or other means may be, used to urge the arm 89 against an aligned pin 94.

A spring-pressed pivot pawl arm 97 (FIG. 3) carrying a roller 98 cooperates with the teeth to maintain the cam wheel 92 in indexed position between periodic movements. The arm 97 is urged into engaging direction by the aid of a tension spring 99 having its free end connected to a stationary part of the apparatus. Thus, for each twenty-four hours or one full day, the cam wheel is advanced by one-seventh of a revolution. This advance may be made use of to reposition the probe and the contact structure so as to cooperate with either set of the annular series of apertures 24 and 25.

The limit to the inward movement of the probe can be accomplished in yet another manner. For example, the ends of selected apertures 24 and 25 just entered by the probe can be counterbored to allow an additional increment of inward movement when the plugs are absent. An additional contact ring (not shown) can then be provided on the insulation support 60 forwardly of the groove 61, together with appropriate circuitry.

The inventor claims:
1. In an electrical control system: means forming a series of contact members; a movable probe; a contact member movable in unison with the probe to cooperate with any one of the series of contact members; means for limiting the movement of the probe; said limiting means including a member having a succession of recesses into which the probe may enter, and having pre-selected depths; and means for operating the probe contact member into contact with one of the series of contact members.

2. The combinations as set forth in claim 1, in which the limiting member is a memory disc having a series of recesses successively brought into registry with the probe, and having preselected depths.

3. The combination as set forth in claim 2, with the addition of a motor for angularly moving the memory disc, a motor for advancing the probe, and a circuit controller operated upon registration of the probe and recess for energizing the probe advancing motor.

4. The combination as set forth in claim 2, in which a flat surface of the disc positions the series of contact members, so that the contact members assume fixed distances from the disc surface to ensure accuracy of selection of the series of contact members.

5. The combination as set forth in claim 1, in which the member is movable and has a plurality of series of recesses, each series corresponding to a selected program; and means for shifting the probe laterally to cooperate with any one of the series of recesses.

6. The combination as set forth in claim 5, in which the movable member is a program disc having a plurality of annularly arranged series of recesses.

7. The combination as set forth in claim 1, with the addition of plugs placed in the recesses of chosen lengths to provide the limits for the probes.

8. In an electrical control system: a movable program device having a series of spaced apertures; a plurality of plugs fitting at least some of the apertures to determine the depth of the recesses formed by the ends of the plugs; a probe entering the apertures in succession as the apertures register with the probe; the plugs limiting inward movement of the probe; a plurality of circuit closers operated selectively by the probe in accordance with the limited position of the probe in the apertures.

9. The combination as set forth in claim 8, in which the circuit closers included contact members spaced longitudinally in a direction corresponding to the direction of movement of the probes.

10. The combination as set forth in claim 8, in which the circuit closers included contact members spaced longitudinally in a direction corresponding to the direction of movement of the probes; a contact member carried by the probe; and means for moving the probe contact member to engage one of the series of contact members.

References Cited in the file of this patent

UNITED STATES PATENTS 2,814,680     Sherrick _____ Nov. 26, 1957